April 23, 1957 E. D. PARKER 2,789,829
FOLDABLE CART
Filed July 1, 1953 2 Sheets-Sheet 1

INVENTOR.
Edwin D. Parker
BY Warren H. F. Schmieding
ATTORNEY

INVENTOR.
Edwin D. Parker

United States Patent Office 2,789,829
Patented Apr. 23, 1957

2,789,829

FOLDABLE CART

Edwin D. Parker, Springfield, Ohio, assignor to The Parker Sweeper Company, Springfield, Ohio, a corporation of Ohio Application July 1, 1953, Serial No. 365,328

2 Claims. (Cl. 280—36)

The present invention relates generally to a cart, and more particularly to a combination cart and hand-truck structure having a foldable frame, the members of the frame being extendable to a position wherein a removable debris receptacle is supported thereby, and said frame members being foldable to a second position wherein the structure forms a hand-truck adapted to transport refuse cans and the like.

Having recognized the need for a general purpose cart for yard work such as conveying leaves, rubbish containers, and the like, the present invention was conceived and developed, the present structure being simple and inexpensive to manufacture.

The cart comprises a wheeled frame including two members which can be adjusted to a relative position wherein the members extend upwardly and outwardly in opposite directions from the wheels and axles to form a V-shaped cart frame. A handle for pushing the cart is provided at the upper end of each member. A flexible debris receptacle is suspended between the upper portion of the members at a position over the wheels. A foot member is provided on the frame so as to extend forwardly of the wheels and engage with the ground surface when the cart is at rest. The foot thereby serves to stabilize the structure, with the receptacle in a horizontal position, when the frame members are disposed in the V-shaped, cart forming configuration.

To convert the cart to a hand-truck for handling refuse cans and the like, the adjustable frame members are brought together, from the V-shaped configuration to a substantially parallel configuration, by pivoting such members at the lower end thereof. When the handle members are disposed in such parallel configuration such members are substantially perpendicular to the foot member previously described. With the present structure in the hand-truck forming configuration, the upper ends of the parallelly disposed frame members can be grasped as a single handle. The structure is then operated as a hand-truck with the parallelly disposed frame members extending forwardly and downwardly from the operator's hands. The structure is then adapted to support a refuse can, or the like, with the side of such can resting on the inclined, parallelly disposed frame members and with the bottom of the can being engageably supported by the foot member.

A further advantage of the present invention lies in the provision of novel mechanism which permits the adjusting of the frame members to both a cart forming and a hand-truck forming configuration.

Another advantage of the present invention resides in the provision of a novel frame structure, including a dual purpose foot member, which foot member serves to stabilize the structure when at rest in the cart forming configuration, and which member further serves to engagingly support the bottom of a refuse can, or the like, when the structure is disposed in the hand-truck forming configuration.

Further objects and advantages of the present invention will be apparent from the following description, reference being had to the accompanying drawings wherein a preferred form of embodiment of the invention is clearly shown.

In the drawings:

Fig. 3 is a side elevational view of the apparatus of the preceding figures, with the frame members being folded to a substantially parallel configuration wherein the structure serves as a hand-truck for transporting refuse cans, and the like.

In Fig. 4 the frame members are disposed in the cart forming configuration.

Figure 1:
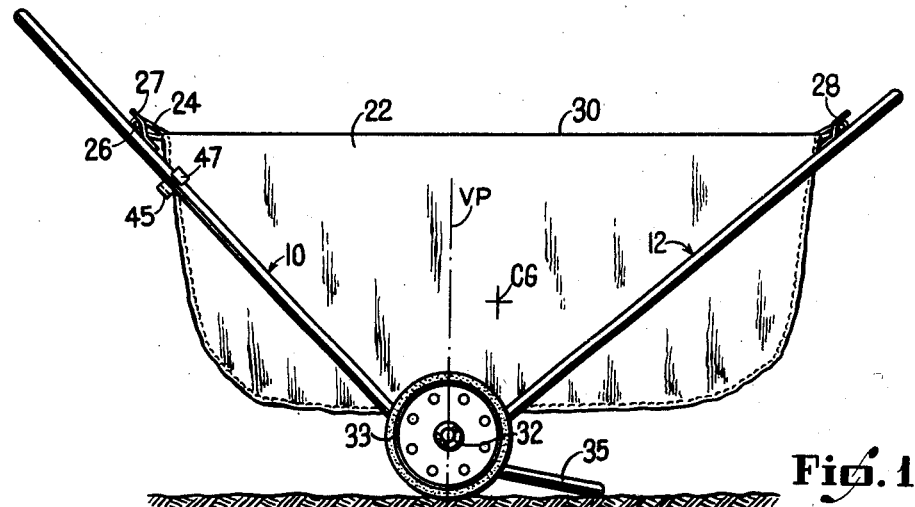
Fig. 1 is a side elevational view of the structure of the present invention with the frame members being disposed in a V-shaped, cart forming configuration.
Figure 2:
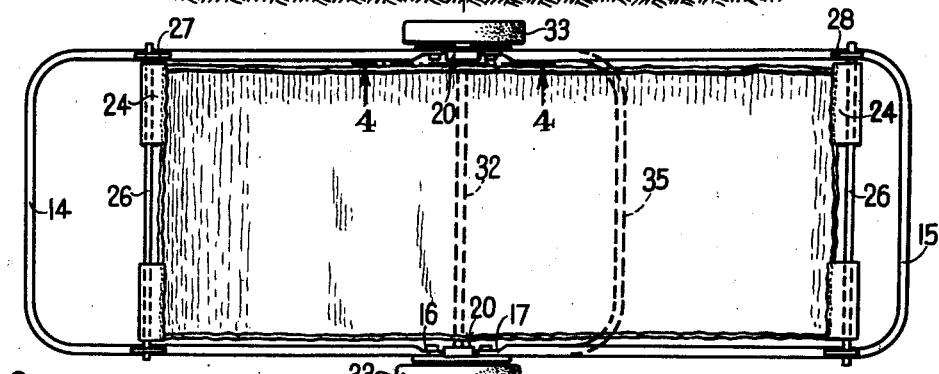
Fig. 2 is a top elevational view corresponding to Fig. 1.

Referring further to the drawing, a side view of the cart of the present invention is shown in Fig. 1. The structure, when disposed as a cart, comprises a frame member 10 which extends upwardly and rearwardly, and a second frame member 12 which extends upwardly and forwardly. The members 10 and 12 are each preferably U-shaped to form laterally extending handles 14 and 15 as best seen in Fig. 2. Each of the lower ends of the U-shaped member 10 is provided with a flat portion 16. Correspondingly, each of the lower end portions of the U-shaped member 12 is provided with a flat portion 17. These flattened end portions are best illustrated in Figs. 4 and 5 where such end portions are shown adjustably mounted to a frame side plate 20 in a manner later to be described.

Referring again to Figs. 1 and 2, a flexible receptacle 22 is shown mounted on the frame structure. Such receptacle is formed of heavy fabric, or the like, and is provided with loops 24 on the upper end portions thereof. A crossrod 26 is passed through the loops 24, at each end of the receptacle 22, for suspending it from the frame. The crossrods 26 are removably supported by the brackets 27, on the member 10, and by the brackets 28 on the member 12. It will be noted that the brackets 28 are mounted closer to the upper end of the member 12, than are the brackets 27 with respect to upper end of the corresponding member 10. Hence, when the upper edge 30, of the receptacle 22, is disposed horizontally relative to the surface of the ground, the center of gravity CG of the cart will lie forwardly of a vertical plane VP passing through the axis of an axle 32 upon which a pair of wheels 33 are rotatably mounted. The location of the center of gravity CG, relative to the vertical plane, VP, is illustrated in Fig. 1.

Figures 4, 5:
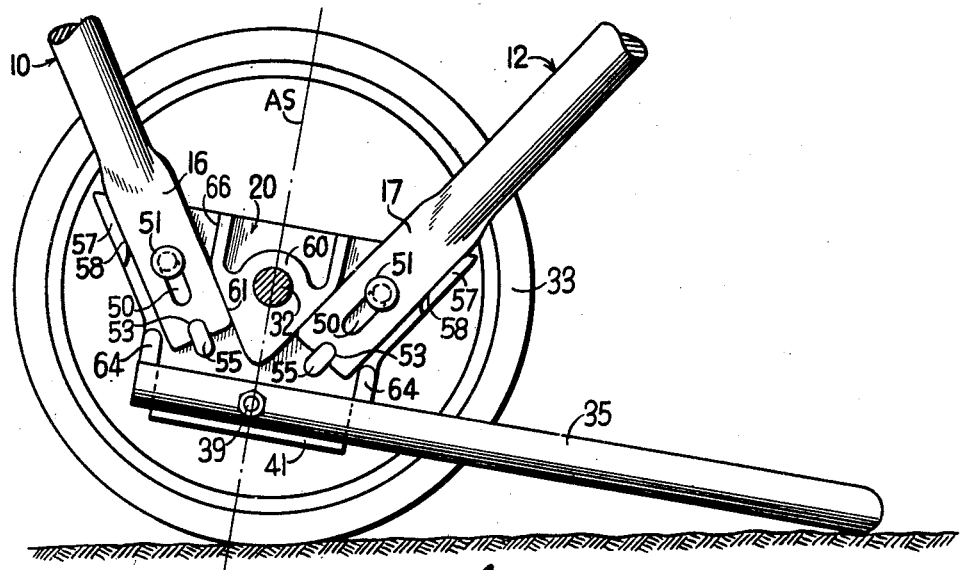
Fig. 4 is a side sectional view, taken along the line 4—4 of Fig. 2, and showing the mechanism which permits adjusting the frame members to both the cart forming and the hand-truck forming configurations.
Fig. 5 is a view corresponding to Fig. 4 wherein the frame members are shown positioned and locked in the substantially parallel, hand-truck forming configuration.

To maintain the cart in a stable position, with the upper edge 30 of the receptacle 22 disposed parallel to the ground, a U-shaped foot member 35 is mounted to the frame side plates 20 as is best seen in Figs. 4 and 5. A laterally disposed portion of the foot member 35 engages the surfaces of the ground, and threaded fastenings 39 serve to secure the foot member 35 to the frame side plates 20. Each of the frame side plates 20 is provided with a flange portion 41 which serves to lock the foot member 35 in fixed relationship relative to the side plates 20.

Figure 3:
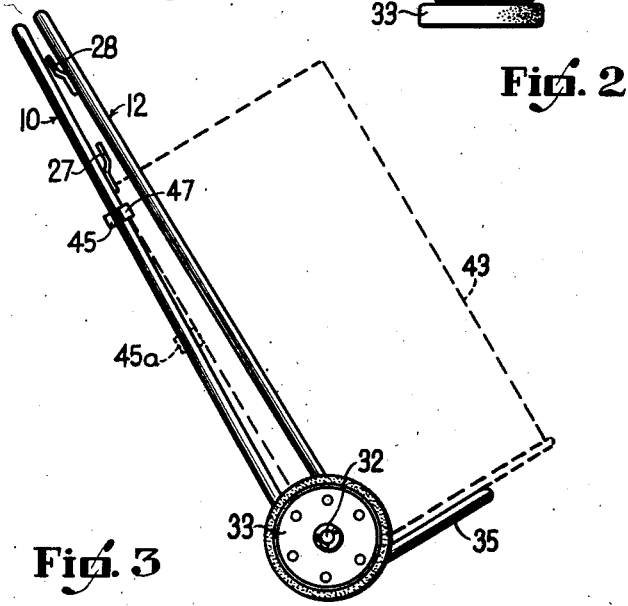

Reference is now made to Fig. 3 wherein the present frame structure is shown adjusted to a configuration whereby a hand-truck is formed for transporting a refuse can 43 or the like. It will be noted that the members 10 and 12 are disposed substantially parallel to each other, and furthermore, such members 10 and 12 are substantially perpendicular to the foot member 35. With such arrangement, the members 10 and 12, and a cross-bracket 45 adjustably mounted to one of them, serve to support the side of the refuse can 43, while, at the same time, the foot member 35 is disposed underneath the bottom of the refuse can 43. It will be noted that the cross-bracket 45 is formed of resilient material and provided with hooked end portions 47 so that the bracket 45 can be snapped on and off of the member 10 and moved to various positions along the length thereof. One of such positions of adjustment is indicated by dotted lines at 45-a in Fig. 3.

When the present apparatus is disposed in the form of a hand-truck, as shown in Figs. 3 and 5, the flexible receptacle 22, shown in Figs. 1 and 2, may be removed therefrom by lifting the crossrods 26 from their mounted positions under the brackets 27 and 28.

With reference to Figs. 4 and 5, a detailed description will now be set forth of suitable mechanism provided for adjustably transforming the present structure from the cart configuration of Figs. 1 and 2 to the hand-truck configuration of Fig. 3. It will be understood that various adjusting mechanisms can be substituted for the specific structure, herein shown and described, without departing from the present inventive concept.

Referring first to Fig. 4, the members 10 and 12 are shown in a V-shaped configuration, whereby the receptacle 22 of Fig. 1, can be spanned between, and supported by, such members. The flattened lower end portions 16 and 17, of the members 10 and 12, are each provided with a closed slot 50. A headed pin 51 extends through each slot 50 and is secured to the frame side plate 20. An open ended slot 53 is formed in the extreme end of each of the members 10 and 12. With the members disposed in the V-shaped configuration of Fig. 4, each of the open ended slots 53 is in engagement with a shoulder 55. Side plate 20 is provided with flanges 57 which flanges form supporting surfaces 58 for the end portions 16 and 17 of the members 10 and 12. Side plate 20 is further provided with a centrally disposed boss 60, which boss forms surfaces 61 for providing additional support for the ends of the members 10 and 12.

For convenience of description, in setting forth the disposition of the members 10 and 12, relative to the frame side plate 20 and to the foot member 35, an axis of symmetry, for the frame side plate 20 is shown and designated AS in Figs. 4 and 5. As is seen in Fig. 4, each of the members 10 and 12 form substantially equal angles of departure from the axis AS. The foot member 35 is disposed substantially perpendicular to the axis AS.

Referring now to Fig. 5, the structure is shown in a configuration wherein the hand-truck of Fig. 3 is formed, in such hand-truck forming configuration, the members 10 and 12 are disposed substantially parallel to the axis of symmetry AS of the side plate 20 to transform the disposition of the members 10 and 12, from the configuration of Fig. 4 to the configuration of Fig. 5, each of the members is lifted upwardly so as to disengage the shoulder 55, the member is then pivoted on the headed pin 51, to a position wherein the open ended slot 53 confronts a second shoulder 64. A surface 66, on the boss 60, serves as a stop for limiting the rotation of the member about the headed pin 51. Each of the members 10 and 12 is then pressed downwardly so that the open ended slot 53 wherein engages the shoulder 64. The members 10 and 12 will then be disposed in the hand-truck configuration of Figs. 3 and 5.

It should be noted that the specific adjusting mechanism, just described can be simplified by replacing the closed slot 50 with a round hole, and by eliminating the open slot 53 and the shoulders 55 and 64. In such simplified instant, frictional resistance to pivoting can be provided between the surfaces on the members 10 and 12 and the side plate 20 for maintaining such members in position.

Referring particularly to Fig. 5, the axis of symmetry AS of the frame side plates 20, together with the members 10 and 12, are shown inclined rearwardly in the position in which said axis and members are disposed when the hand-truck is in the operational position. With further reference to Fig. 5, it will be seen that the foot member 35 is extended forwardly and upwardly, relative to the ground surface, with such foot member 35 being substantially perpendicular to the axis AS and the members 10 and 12.

From the foregoing it will be seen that the present invention provides a novel structure which can be readily adjusted to form either a cart or a hand-truck. The structure embraces novel mechanism for adjusting the structure in each of the positions of adjustment. Moreover, the concept of readily adjusting a structure to either a cart or a hand-truck is unobvious, and the resulting devices possess high utility.

While the form of embodiment of the present invention as herein disclosed constitutes a preferred form, it is to be understood that other forms might be adopted, all coming within the scope of the claims which follow.

I claim:
1. A foldable cart comprising in combination a pair of axially spaced wheels; a frame including an axle carried by the wheels, two side plates carried by the axle, rigid foot member means fixedly attached to the side plates and projecting forwardly thereof, an inverted U-shaped member including legs, the lower end of one of said legs being pivotally connected to one of said side plates, the lower end of the other of said legs being pivotally connected to the other of said side plates, a second inverted U-shaped member including legs, the lower end of one of the legs of the second-mentioned U-shaped member being pivotally connected to one of said side plates forwardly of the pivotal connection of the leg of the first-mentioned U-shaped member, the lower end of the other of said legs of the second-mentioned U-shaped member being pivotally connected to the other of said side plates forwardly of the pivotal connection of the leg of the first-mentioned U-shaped member, shoulders on the frame members for limiting rearward movement of the legs of the first-mentioned U-shaped member and shoulders on the frame members for limiting forward movement of the legs of the second-mentioned U-shaped member; and a receptacle having one end removably attached to the first-mentioned U-shaped member and having the other end removably attached to the second-mentioned U-shaped member.

2. A foldable cart as defined in claim 1, characterized in that the receptacle is formed of flexible material.

References Cited in the file of this patent

UNITED STATES PATENTS

| 595,386 | Hall et al. | Dec. 14, 1897 |
| 639,338 | Barns | Dec. 19, 1899 |
| 725,828 | Davis | Apr. 21, 1903 |
| 2,422,862 | Stottrup | June 24, 1947 |
| 2,442,620 | Simpson et al. | June 1, 1948 |
| 2,693,968 | Bateman et al. | Nov. 9, 1954 |
| 2,716,559 | Boyce | Aug. 30, 1955 |

FOREIGN PATENTS

| 869,564 | France | Nov. 17, 1941 |
| 225,030 | Germany | Aug. 8, 1910 |
| 807,463 | Germany | June 28, 1951 |
| 422,413 | Italy | June 16, 1947 |
| 108,256 | Sweden | Aug. 17, 1943 |